Aug. 4, 1953  E. A. PUERNER  2,647,492
HYDRAULIC SERVOMOTOR
Filed Aug. 11, 1949  2 Sheets-Sheet 1
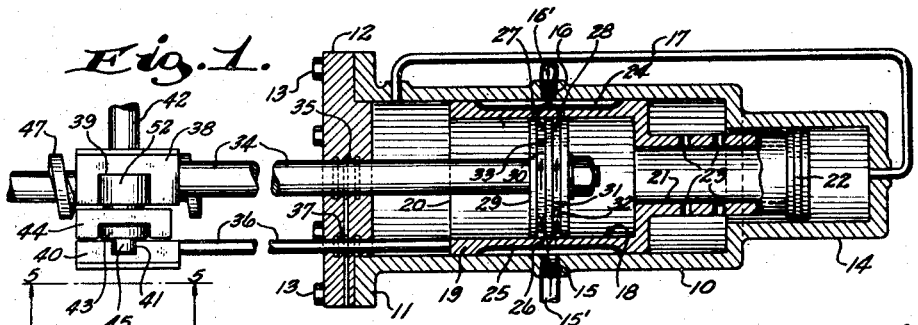
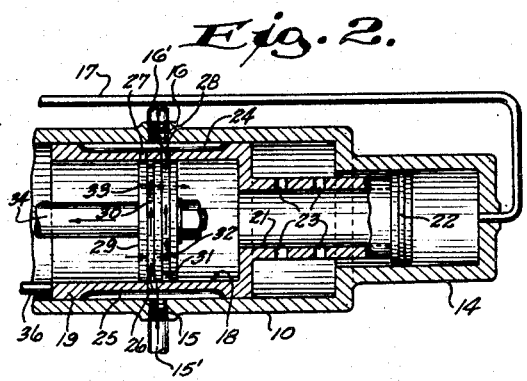
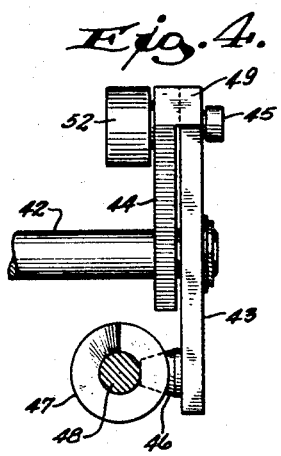
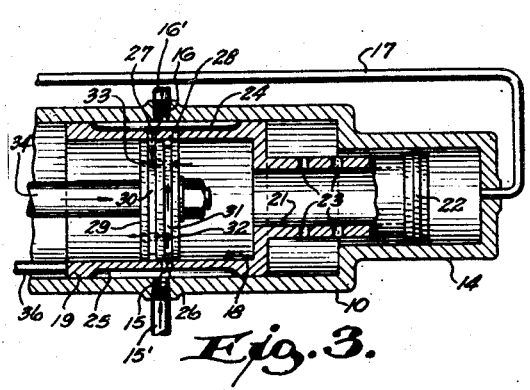
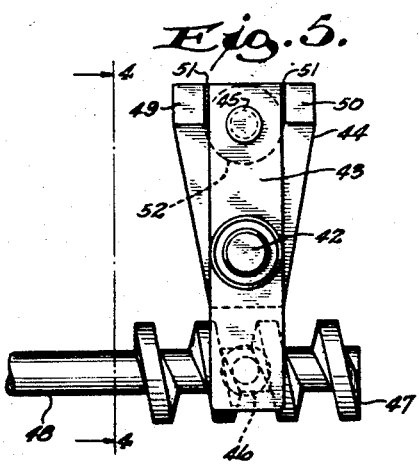
INVENTOR.
Erving A. Puerner,
BY Morsell & Morsell
ATTORNEYS Aug. 4, 1953 E. A. PUERNER 2,647,492
HYDRAULIC SERVOMOTOR
Filed Aug. 11, 1948 2 Sheets-Sheet 2
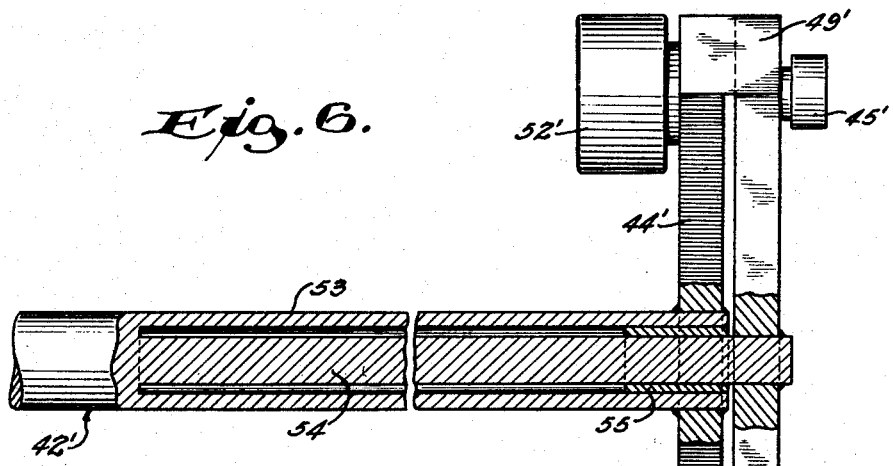
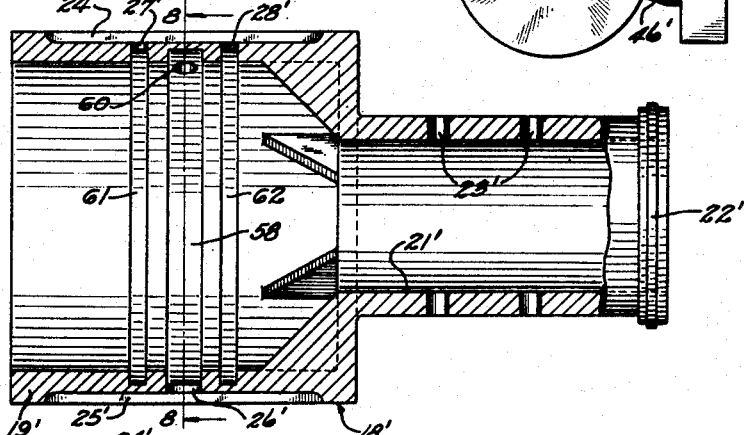
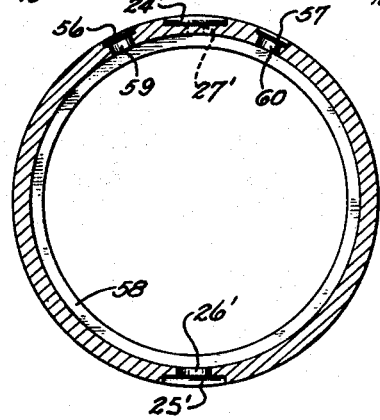
INVENTOR.
Erving A. Puerner,
BY Morsell & Morsell
ATTORNEYS.

Patented Aug. 4, 1953

2,647,492

UNITED STATES PATENT OFFICE 2,647,492

HYDRAULIC SERVOMOTOR

Erving A. Puerner, Milwaukee, Wis., assignor to Shallcross Controls, Inc., Milwaukee, Wis., a corporation of Wisconsin Application August 11, 1948, Serial No. 43,727

22 Claims. (Cl. 121—41)

1

This invention relates to improvements in hydraulic servomotors.

Servomotors, generally speaking, are auxiliary motors which are regulated by a hand lever or wheel for quickly and easily performing an operation requiring a relatively large amount of power. For example, a servomotor may be used for moving the steering gear of a large ship, truck, tractor or tank into any desired position indicated by that of the hand lever or wheel which controls the valve to the motor.

Experience has proven that the hydraulically operated servomotor gives very satisfactory service and for this reason the hydraulic type of servomotor has found wide application. Conventional hydraulic servomotors, however, are complicated mechanisms which have many parts, and which are difficult and expensive to manufacture.

It is, therefore, a general object of the invention to provide an improved hydraulic servomotor of novel construction which embodies therein a minimum number of working parts.

A further object of the invention is to provide an improved hydraulic servomotor which is rugged in construction and which is economical to manufacture and repair.

A further object of the invention is to provide a servomotor of the class described wherein the valve for controlling said motor is included as an integral part of the motor itself, thereby eliminating many parts required in conventional servomotors.

A further object of the invention is to provide a servomotor of the class described having a control sleeve therein provided with a compensating piston which prevents hydraulic pressures from augmenting the force applied to the hand wheel by the operator for the purpose of moving said control sleeve.

A further object of the invention is to provide a servomotor of the class described which can be made in a variety of sizes and which is well adapted for use in a wide variety of applications.

With these and other objects in view the invention consists of the improved servomotor and all of its parts and combinations as set forth in the claims, and all equivalents thereof.

In the drawing accompanying and forming a part of this specification wherein is shown one complete embodiment of the preferred form of the invention and wherein the same reference characters indicate the same parts in all of the views:

Fig. 1 is a plan view, partly in longitudinal

2 horizontal section, of the improved servomotor;

Fig. 2 is a fragmentary longitudinal sectional view of the servomotor showing the control sleeve moved to the left;

Fig. 3 is a view similar to that of Fig. 2, showing the control sleeve moved to the right;

Fig. 4 is an enlarged end view, taken on line 4—4 of Fig. 5, of the steering worm, the sleeve or valve rod lever, and the piston rod lever, with the slide blocks removed;

Fig. 5 is an enlarged side view of the steering worm, the sleeve or valve rod lever and the piston rod lever with the slide blocks removed, taken along the line 5—5 of Fig. 1;

Fig. 6 is an enlarged end view similar to Fig. 4, of a modified form of main driven shaft having both the piston rod lever and the valve rod lever fixed thereto, parts being broken away and shown in section;

Fig. 7 is a longitudinal sectional view of a modified form of control sleeve or valve; and Fig. 8 is a transverse sectional view taken along the line 8—8 of Fig. 7.

Referring to the drawing, the improved servomotor consists of a cylinder 10 having one end open and formed with an outwardly projecting annular flange 11. A circular cover plate 12 is fixedly attached to the flange 11 of the cylinder 10, as by cap screws 13. The opposite end of the cylinder 10 is formed with a coaxial cylinder 14 of smaller diameter which projects longitudinally therefrom and which communicates therewith as shown in Figs. 1, 2 and 3.

The side wall of the cylinder 10 is preferably formed at a point midway of its length with a pair of diametrically opposite apertures 15 and 16. The aperture 15 is preferably connected by a conduit 15' to a source of continuous hydraulic pressure, such as a continuously operating, constant displacement pump (not shown). The aperture 16 is preferably connected by a conduit 16' to a reservoir or sump (not shown). A pressure equalizing conduit 17 communicates with the interior of the cylinder 10 near the flanged end thereof and with the outer closed end of the cylinder 14 as shown in Fig. 1.

A control sleeve or valve 18, which is similar in shape to that of the cylinders 10 and 14 is slidably positioned within said cylinders. The control sleeve 18 consists of a portion 19 which has an open end 20 and which is formed at the opposite end with a coaxial piston 21. The portion 19 has an outer diameter substantially equal to the bore of the cylinder 10, and the piston 21 has an outer diameter slightly less than that of the bore of the cylinder 14. At its outer end the piston 21 is closed and is provided with a sealing ring 22 which prevents leakage of fluid therepast while permitting sliding movement of the piston 21 in the cylinder 14. The area of the bore of the cylinder 14 is substantially equal to the annular area of the end 20 of the control sleeve or valve 18. The side wall of the piston 21 is formed with a plurality of apertures 23 extending therethrough. The side wall of the portion 19 of the sleeve 18 is also preferably formed with a pair of diametrically oppositely disposed longitudinally extending grooves 24 and 25 which register respectively with the apertures 16 and 15. An aperture 26 preferably extends through the side wall of the control sleeve 18 from a point midway of the groove 25. A pair of spaced apertures 27 and 28 project through the side wall of the control sleeve 18 approximately midway of the groove 24.

A power piston 29 is slidably positioned within the portion 19 of control sleeve 18. The piston 29 is formed with a pair of spaced circumferential grooves 30 and 31. As viewed in Figs. 1, 2 and 3, the piston 29 is formed with a passageway 32 which extends inwardly from the left end wall thereof and communicates with the groove 31. Similarly viewed, the piston 29 is formed with a passageway 33 which extends inwardly from the right end wall thereof and communicates with the groove 30. The cylinders 10 and 14, and the control sleeve or valve 18 are normally filled with hydraulic fluid. While only one passage 32 and one passage 33 are shown, it is obvious that more than one passage may be used in each case if desired.

The power piston 29 is provided with a piston rod 34 which is fixedly connected thereto and which slidably projects through an aperture 35 in the plate 12, the aperture 35 being provided with suitable sealing rings. The control sleeve or valve 18 is also provided with a rod 36 which is fixedly connected thereto and which slidably projects through an aperture 37 in the plate 12, the aperture 37 also being provided with suitable sealing rings.

Referring to Fig. 1, the piston rod 34 has attached to its outer end, a slide block 38 which has formed in one side face thereof a vertically extending, preferably rectangular groove 39. Formed on the outer end of the sleeve or valve rod 36 is a slide block 40 which has a vertically extending rectangular groove 41 formed in a side face thereof. The grooves 39 and 41 of the slide blocks 38 and 40 preferably face each other as shown in Fig. 1.

A main driven shaft 42, which is connected in any suitable manner (not shown) to the apparatus to be actuated by the improved servomotor, is suitably mounted on a horizontal axis below the blocks 38 and 40, and preferably extends at a right angle to the rods 34 and 36. Pivotally mounted near one end of the shaft 42 for movement in a vertical plane is a sleeve or valve rod lever 43. The lever 43 is pivoted near its midpoint. At its upper end the lever 43 is provided on its outer face with a relatively small roller 45 which slidably fits into the groove 41 in the sliding block 40. The lever 43 is formed on its inner face and near its lower end with a frusto-conical lug 46. The lug 46 slidably engages the helical groove of a cam or worm 47 which is suitably rotatably mounted in a manner to extend substantially parallel with the rods 34 and 36. The cam or worm 47 is so mounted that it cannot move axially. The cam or worm 47 is provided with an axially projecting shaft 48 which is suitably connected to a manually operated wheel (not shown). A piston rod lever 44 is positioned adjacent the valve or sleeve rod lever 43 and is fixed at its lower end to the main driven shaft 42. The lever 44 at its lower end is preferably substantially the same width as the lever 43, and it preferably widens out toward its upper end, as shown in Fig. 5. At its upper end the lever 44 is formed with a pair of lugs 49 and 50 projecting from its outer face. One of said lugs is positioned on each side of the upper end of the lever 43. There is a predetermined space 51 between the sides of the lever 43 and each of the lugs 49 and 50 when the mechanism is in neutral position as shown in Fig. 5. Projecting from the upper end of the inner face of the lever 44 is a relatively large roller 52 which is slidably positioned in the groove 39 of the sliding block 38.

When the improved servomotor is in neutral or stopped position the parts thereof are in substantially the relationship shown in Figs. 1, 4 and 5. When the mechanism is in this position it will be noted from Fig. 5 that the upper end of the lever 43 is centered between the lugs 49 and 50. In Fig. 1 it will be noted that the diameter of the port 26 is slightly larger than the space between the circumferential piston grooves 30 and 31. The width of the ports 26, 27 and 28 and of the grooves 30 and 31, and the relative positions thereof is such that when the mechanism is in neutral or stopped position, hydraulic fluid under pressure will, as indicated by the arrows, enter the inlet 15, pass through the longitudinal groove 25, through the port 26, through the grooves 30 and 31 around the piston 29, through the ports 27 and 28, through the longitudinal groove 24, and back to the reservoir or sump through the outlet 16. It is apparent that while hydraulic fluid is flowing through the cylinder 10, no force is exerted on the power piston 29 when in neutral position. The piston 29, therefore, remains at rest, as does the main driven shaft 42.

Now, assuming that it is desired to rotate the main driven shaft 42 in a counter-clockwise direction as viewed in Fig. 5, all that is necessary is to turn the hand wheel (not shown) in a manner to rotate the shaft 48 and to turn the cam or worm 47 in a counter-clockwise direction as viewed in Fig. 4. This will cause the frusto-conical lug 46 to be moved toward the right, as viewed in Fig. 5, by the cam or worm 47. Since the lever 43 is pivoted on the main driven shaft 42, it will pivot about said shaft until the upper end thereof comes into contact with the lug 49 of the lever 44. As the lever 43 so pivots, the sleeve or valve control rod 36, with its slide block 40, is moved outwardly or toward the left, thereby moving with it the control sleeve or valve 18. The control sleeve or valve 18 is thereby brought to the position shown in Fig. 2 relative to the power piston 29.

Referring to Fig. 2 it will be noted that by moving the control sleeve or valve 18 to the left a distance substantially equal to space 51 between the upper end of the lever 43 and the lug 49 shown in Fig. 5, the port 26 is moved out of communication with the circumferential piston groove 31 and into more complete registration with the circumferential piston groove 30. At the same time, the port 27 is moved out of communication with the circumferential groove 30 and is sealed off by the side wall of the piston 29, and the port 28 is made to register with the circumferential groove 31.

As shown by the arrows in Fig. 2, hydraulic fluid under high pressure flows into the inlet 15 and enters the longitudinal groove 25 and the port 26 as before. Now, however, the fluid flows into the circumferential piston groove 30, through the passage 33 and into the interior of the control valve or sleeve 18 on the right hand side of the power piston 29. This fluid under high pressure forces the piston 29 to the left. As the piston 29 so moves, fluid from the left hand side of the piston flows out through the passage 32, the circumferential groove 31, the port 28, the longitudinal groove 24, and back to the reservoir through the outlet 16. This action will continue until the power piston 29 and the control sleeve or valve 18 are again in neutral position relative to each other.

When it is desired to rotate the main driven shaft 42 in a clockwise direction as viewed in Fig. 5, the hand wheel is rotated in a manner to rotate the shaft 48 in a clockwise direction. This will move the control sleeve or valve 18 to the right of its neutral position relative to the power piston to the position shown in Fig. 3.

When the component parts of the mechanism are disposed as shown in Fig. 3, the port 26 is out of communication with circumferential groove 30, and is in complete registration with the groove 31. The port 28 is out of communication with the circumferential groove 31 and is sealed off by the side wall of the piston 29, and the port 27 is in complete registration with the circumferential groove 30.

As is shown by the arrows in Fig. 3, the high pressure hydraulic fluid enters through the inlet 15, passes through the longitudinal groove 25, through the port 26, into the circumferential groove 31, through the passage 32 and flows into the cylinder 10 on the left side of the power piston 29. This forces the piston 29 to the right and causes fluid on the right side of the piston 29 to flow back to the reservoir through the passage 33, the groove 30, the port 27, the groove 24 and the outlet 16, as indicated by the arrows. The piston 29 will be moved to the right by hydraulic pressure until the control sleeve or valve 18 and the power piston 29 are again in neutral position relative to one another.

It is apparent that a slight movement of the control sleeve or valve 18 in either direction results in a "follow up" movement of the power piston 29 which is exactly equal to the sleeve movement and in the same direction. By utilizing this action in the improved servomotor the manual effort which is applied to the hand wheel is amplified sufficiently by hydraulic force acting against the power piston 29 to rotate the main driven shaft 42 and to actuate the apparatus connected thereto, whether it be a steering gear, reversing lever, or any other mechanism. The power is transmitted from the power piston 29 through the piston rod 34, the slide block 38, the roller 52 and the lever 44 to the shaft 42.

The lugs 49 and 50 of the lever 44 at all times act to limit the travel of the control sleeve or valve 18 relative to the piston 29. This insures that the sleeve 18 and the piston 29 are at all times maintained in operative relationship. The arrangement of the levers 43 and 44 is merely illustrative of one means for accomplishing this result.

While the power piston 29 and the control sleeve or valve 18 are shown positioned at about the midpoint of their range of travel in the cylinder 10, the action is the same whether these parts are positioned as shown, or at any other point within the limits of their travel. The piston 29 and the control sleeve or valve 18 can assume the neutral or stopped position at any point within their range of travel. No matter in which direction the control sleeve or valve 18 is moved, the piston 29 will follow it and assume the neutral relationship.

Since the lugs 49 and 50 limit the travel of the control sleeve 18 relative to the piston 29 the above description describes what would appear to be a step-by-step movement of the improved servomotor. The improved mechanism, however, is not limited to step-by-step movement. After the hand wheel is turned in one direction to bring the upper end of the lever 43 into engagement with, for example, the lug 49, and the power piston 29 has started to follow up and to move the lug 49 out of said engagement, if manual pressure is continuously applied to the hand wheel to urge the upper end of the lever 43 into contact with the lug 49, the piston 29 will continue to move and will not come to a neutral position until the pressure on the hand wheel is released or until the control sleeve or valve reaches the limits of its travel. As the piston 29 is continuously moved, the main driven shaft 42 is correspondingly rotated as heretofore described.

As hereinbefore mentioned, the area of the bore of the cylinder 14 is substantially equal to the area of the annular surface at the end 20 of the control sleeve or valve 18. When the sleeve 18 is moved toward the right from the position shown in Fig. 1, hydraulic pressures acting against the outer end of the piston 21 from the pressure equalizing conduit 17 neutralize the hydraulic pressures acting in the opposite direction on the annular surface at the end 20 of the control sleeve 18 and tending to move said sleeve toward the right. When the sleeve 18 is moved to the left from the position shown in Fig. 1, fluid under pressure is applied to the right hand side of the piston 29. This pressure also acts against the inner pressure surfaces (principally the inner surface of the end wall of the piston 21 urging said piston and the sleeve 18 in the opposite direction to neutralize the hydraulic force within the cylinder 10 at the right hand side of the piston 29 tending to move the sleeve 18 to the left. Were it not for the compensating piston 21 and its seal ring 22, a force of considerable magnitude would be created which would augment the manual force exerted in either direction on shaft 48 by the operator turning the handwheel. Overcoming this augmenting force manually would be extremely difficult. By employing the compensating piston 21 the only force which it is necessary to exert on the handwheel in order to operate the improved mechanism is that which is sufficient to overcome the friction and the inertia of the various parts of the control mechanism. This force, in turn, is amplified sufficiently by the improved servomotor to actuate mechanisms which require large amounts of power for actuation. The construction of the improved servomotor is such that it provides accurate control of the movement of the mechanism which it actuates.

Referring to Fig. 6 wherein is shown a modified form of the invention, a shaft 42' is used in place of the main driven shaft 42 of the principal form of the invention. The shaft 42' is formed with a tubular end portion 53. Integral with the shaft 42' and concentric with the tubular end portion 53 is a torsion rod 54 which projects slightly beyond the end of the portion 53. A bearing 55 is preferably positioned in the tubular portion 53 at the end thereof and rotatably embraces the torsion rod 54. A piston rod lever 44' similar to the piston rod 44 is fixed to the end of the tubular portion 53, and a control sleeve rod 43' similar to the control sleeve rod 43 is fixed to the end of the torsion rod 54 as shown. All of the members in Fig. 5 which are indicated by primed numerals are substantially identical with the members in the principal form which are indicated by the same numerals unprimed.

It is apparent that when the modified form of Fig. 5 is used, rotation of the handwheel will cause rotation of the shaft 48' and will tend to cause the control sleeve lever 43' to rotate about the torsion rod 54. However, since the lever 43' is fixed to the rod 54, rotation of the shaft 48' and the worm 47' will cause an axial twisting of the torsion rod 54. The twisting of the rod 54 is limited by the lugs 49' and 50' (not shown) which coact with the lever 43' in the same manner as the lugs 49 and 50 coact with the lever 43. The connection between the levers 43' and 44' and that between the levers 43 and 44 is of the type commonly known as a "lost motion" connection.

The torsion rod 54 tends to center the control sleeve lever between its coacting limiting lugs 49' and 50'. It also gives the operator a force to work against in turning the handwheel. This mechanism is of particular value in steering gears for vehicles because it gives the operator the feel of the road. Without the torsion bar 54, any unusual road condition which tends to upset the equilibrium of the system is automatically compensated for, and the operator cannot feel it, whereas all of such upsetting forces can be felt by the operator when the torsion bar is used, due to the fact that it is fixedly connected to the control rod lever.

Referring to Figs. 7 and 8, there is shown a modified form of control sleeve indicated by the numeral 18'. In Figs. 7 and 8 the primed reference numerals also indicate corresponding parts of the principal form which are indicated by unprimed numerals. The modified form of sleeve 18' is formed with a pair of longitudinally extending external grooves 56 and 57 which are located, as shown in Fig. 8, one on each side of the groove 24'. The grooves 56 and 57 are preferably the same length as and are preferably half as wide as the groove 25'. The sleeve 18' is also formed with an internal circumferential groove 58 which communicates with the groove 25' through the inlet aperture 26. The groove 58 also communicates with the grooves 56 and 57 as by the apertures 59 and 60 (see Fig. 8). The modified form of sleeve 18' may also be formed with a pair of internal circumferential grooves 61 and 62 which communicate with the outlet apertures 27' and 28'.

By having the sleeve 18' formed with the grooves 56 and 57 which are in communication with the groove 25', the hydraulic pressures which act inwardly against the sleeve 18' from the groove 25 are neutralized by equal pressures acting inwardly from the grooves 56 and 57, thereby eliminating a large unbalance of lateral pressures on the sleeve 18' and reducing the friction which would be created thereby.

Various changes and modifications may be made without departing from the spirit of the invention, and all of such changes are contemplated as may come within the scope of the claims.

What is claimed as the invention is:

1. In a servomotor, the combination of a cylinder having a pair of separated ports and formed with an axial bore, a conduit entering one of said cylinder ports for supplying fluid under pressure, a ported sleeve axially slidable within the bore of said cylinder, the ports of the cylinder and of the sleeve cooperating to provide fluid communication to and from the bore of the sleeve, a piston axially slidable within the bore of the sleeve, said piston being formed with spaced passages therein, and means for moving said sleeve to cause selective communication of said sleeve ports with said piston passages and to thereby cause corresponding movement of the piston by hydraulic pressure.

2. In a servomotor, the combination of a cylinder having an inlet port and an outlet port and having an axial bore, a conduit entering said inlet port for supplying fluid under pressure, a sleeve axially slidable within the bore of said cylinder, said sleeve being formed with an inlet port and a pair of spaced outlet ports, the ports of the cylinder and of the sleeve cooperating to provide fluid communication to and from the bore of the sleeve, a piston axially slidable within the bore of the sleeve, said piston being formed with spaced passages therein, and means for moving said sleeve to cause selective communication of said sleeve ports with said piston passages and to thereby cause corresponding movement of the piston by hydraulic pressure.

3. In a servomotor, the combination of a cylinder having an inlet port and an outlet port and having an axial bore, a conduit entering said inlet port for supplying fluid under pressure, a sleeve axially slidable within the bore of said cylinder, said sleeve being formed with an inlet port and with a pair of spaced outlet ports, the ports of the cylinder and of the sleeve cooperating to provide fluid communication to and from the bore of the sleeve, a piston axially slidable within the bore of the sleeve, said piston being formed with a pair of spaced transverse passages therein, one of said passages being provided with means for communication with one end wall of said piston, and the other of said passages being provided with means for communication with the other end wall of the piston, and means for moving said sleeve to cause selective communication of said sleeve ports with said piston passages and to thereby cause corresponding movement of the piston by hydraulic pressure.

4. In a servomotor, the combination of a cylinder having an inlet port and an outlet port and having an axial bore, a conduit entering said inlet port for supplying fluid under presure, a sleeve axially slidable within the bore of said cylinder, said sleeve being formed with an inlet port and with a pair of spaced outlet ports, the ports of the cylinder and of the sleeve cooperating to provide fluid communication to and from the bore of the sleeve, a piston axially slidable within the bore of the sleeve, said piston being formed with a pair of spaced transverse passages therein, each of which commnuicates with a separate pair of spaced points on said piston side wall, one of said passages being provided with means for communication with one end wall of said piston, and the other of said passages being provided with means for communication with the other end wall of the piston, and means for moving said sleeve to cause selective communication of said sleeve ports with said piston passages and to thereby cause corresponding movement of the piston by hydraulic pressure.

5. In a servomotor, the combination of a cylinder having an inlet port and an outlet port and having an axial bore, a conduit entering said inlet for supplying fluid under pressure, a sleeve axially slidable within the bore of the cylinder, said sleeve being formed with an inlet port and with a pair of spaced outlet ports, the ports of the cylinder and of the sleeve cooperating to provide fluid communication to and from the bore of the sleeve, a piston axially slidable within the bore of the sleeve, said piston being formed with a pair of spaced transverse passages therein each of which communicates with a separate pair of spaced points on the piston side wall, said piston also being formed with a duct projecting inwardly from one end wall thereof and intersecting one of said passages, said piston also being formed with a second duct projecting inwardly from the opposite end wall thereof and intersecting the other of said passages, and means for moving said sleeve to cause selective communication of said sleeve ports with said piston passages and to thereby cause corresponding movement of the piston by hydraulic pressure.

6. In a servomotor, the combination of a cylinder having an inlet port and an outlet port and having an axial bore, a conduit entering said inlet port for supplying fluid under pressure, a sleeve axially slidable within the bore of the cylinder, said sleeve being formed with an inlet port and with a pair of spaced outlet ports, the ports of the cylinder and of the sleeve cooperating to provide fluid communication to and from the bore of the sleeve, a piston axially slidable within the bore of the sleeve, said piston being formed with a pair of spaced transverse passages therein each of which communicates with a separate pair of spaced points on the piston side wall, said piston also being formed with a duct projecting inwardly from one end wall thereof and intersecting one of said passages, said piston also being formed with a second duct projecting inwardly from the opposite end wall thereof and intersecting the other of said passages, said sleeve ports and said passages being arranged in a manner so that the sleeve may be selectively positioned with the sleeve inlet port in communication with both of said piston passages while the sleeve outlet ports are also in communication with said passages or so that the sleeve inlet port is in communication with one of said passages while the other of said passages is in communication with one of said sleeve outlet ports, and means for moving said sleeve and thereby causing corresponding movement of the piston.

7. In a servomotor, the combination of a cylinder having an inlet port and an outlet port and having an axial bore, a conduit entering said inlet port for supplying fluid under pressure, a sleeve axially slidable within the bore of the cylinder, said sleeve being formed with an inlet port and with a pair of spaced outlet ports, the ports of the cylinder and of the sleeve cooperating to provide fluid communication to and from the bore of the sleeve, a piston axially slidable within the bore of the sleeve, said piston being formed with a pair of spaced circumferential grooves, said piston also being formed with a duct projecting inwardly from one end wall thereof and intersecting one of said grooves, said piston also being formed with a second duct projecting inwardly from the opposite end wall thereof and intersecting the other of said grooves, said sleeve ports and said grooves being arranged in a manner so that the sleeve may be selectively positioned with the sleeve inlet port in communication with both of said piston grooves while the sleeve outlet ports are also in communication with said grooves or so that the sleeve inlet port is in communication with one of said grooves while the other of said grooves is in communication with one of said sleeve outlet ports, and means for moving said sleeve and thereby causing corresponding movement of the piston.

8. In a servomotor, the combination of a cylinder having a pair of ports and also having a main bore, said cylinder having a coaxial bore of reduced diameter at one end thereof, a conduit entering one of said cylinder ports for supplying fluid under pressure, a ported sleeve axially slidable within the main bore of said cylinder, said sleeve being formed on one end with a piston which is slidable in said bore of reduced diameter, the ports of the cylinder and of the sleeve cooperating to provide fluid communication to and from the bore of the sleeve, a piston axially slidable within the bore of the sleeve, said piston being formed with spaced passages therein, means for moving said sleeve to cause selective communication of said sleeve ports with said piston passages and to thereby cause corresponding movement of the piston by hydraulic pressure, and a pressure equalizing conduit communicating at one end with the outer end of said bore of reduced diameter and communicating at its other end with the main bore adjacent the end thereof opposite said reduced bore portion for neutralizing hydraulic pressures augmenting movement of the sleeve.

9. In a servomotor, the combination of a cylinder having a pair of ports and also having a main bore, said cylinder having a coaxial bore of reduced diameter at one end thereof, a conduit entering one of said cylinder ports for supplying fluid under pressure, a ported sleeve axially slidable within the main bore of said cylinder, said sleeve being formed on one end with a piston which is slidable in said bore of reduced diameter, the area of the end of said piston being substantially equal to the area of the annular surface at the opposite end of the sleeve, the ports of the cylinder and of the sleeve cooperating to provide fluid communication to and from the bore of the sleeve, a piston axially slidable within the bore of the sleeve, said piston being formed with spaced passages therein, means for moving said sleeve to cause selective communication of said sleeve ports with said piston passages and to thereby cause corresponding movement of the piston by hydraulic pressure, and a pressure equalizing conduit communicating at one end with the outer end of said bore of reduced diameter and communicating at its other end with the main bore adjacent the end thereof opposite said reduced bore portion for neutralizing hydraulic pressures augmenting movement of the sleeve.

10. In a servomotor, the combination of a cylinder having an inlet port and an outlet port, said cylinder having a main bore and a coaxial bore of reduced diameter at one end thereof, a conduit entering said inlet port for supplying fluid under pressure, a sleeve axially slidable within the main bore of said cylinder, said sleeve being formed at one end with a piston which is slidable in said bore of reduced diameter, said sleeve being formed with an inlet port and with a pair of spaced outlet ports, the ports of the cylinder and of the sleeve cooperating to provide fluid communication to and from the bore of the sleeve, a piston axially slidable within the bore of the sleeve, said piston being formed with a pair of spaced transverse passages therein, each of which communicates with a separate pair of spaced points on said piston side wall, one of said passages being provided with means for communication with one end wall of said piston, and the other of said passages being provided with means for communication with the other end wall of the piston, means for moving said sleeve to cause selective communication of said sleeve ports with said piston passages and to thereby cause corresponding movement of the piston by hydraulic pressure, and a pressure equalizing conduit communicating at one end with the outer end of said bore of reduced diameter and at the other end with the main bore adjacent the end thereof opposite said reduced bore portion for neutralizing hydraulic pressures augmenting movement of the sleeve.

11. In a servomotor, the combination of a cylinder having a pair of ports and formed with an axial bore, a conduit entering one of said cylinder ports for supplying fluid under pressure, a ported sleeve axially slidable within the bore of said cylinder, the ports of the cylinder and of the sleeve cooperating to provide fluid communication to and from the bore of the sleeve, a piston axially slidable within the bore of the sleeve, said piston being formed with spaced passages therein, means for moving said sleeve to cause selective communication of said sleeve ports with said piston passages and to thereby cause corresponding movement of the piston by hydraulic pressure, and means for limiting the movement of said sleeve relative to said piston.

12. In a servomotor, the combination of a cylinder having a pair of ports and also having a main bore, said cylinder having a coaxial bore of reduced diameter at one end thereof, a conduit entering one of said cylinder ports for supplying fluid under pressure, a ported sleeve axially slidable within the main bore of said cylinder, said sleeve being formed on one end with a piston which is slidable in said bore of reduced diameter, the ports of the cylinder and of the sleeve cooperating to provide fluid communication to and from the bore of the sleeve, a piston axially slidable within the bore of the sleeve, said piston being formed with spaced passages therein, means for moving said sleeve to cause selective communication of said sleeve ports with said piston passages and to thereby cause corresponding movement of the piston by hydraulic pressure, a pressure equalizing conduit communicating at one end with the outer end of said bore of reduced diameter and communicating at its other end with the main bore adjacent the end thereof opposite said reduced bore portion for neutralizing hydraulic pressures augmenting movement of the sleeve, and means for limiting the movement of said sleeve relative to said piston.

13. In a servomotor, a cylinder having an inlet port and an outlet port, a conduit entering said inlet port for supplying fluid under pressure, a ported control sleeve reciprocatable in said cylinder, said sleeve being formed with an external longitudinally extending groove which is positioned to register with said inlet port in all positions of reciprocation of said sleeve, said sleeve also being formed with at least one external longitudinally extending groove which is in communication with said first mentioned groove and which is positioned on the side of said sleeve opposite from said first mentioned groove, whereby the hydraulic pressures from fluid in said first mentioned groove acting inwardly against said sleeve are neutralized by pressures from fluid in the groove on the opposite side of the sleeve.

14. In a servomotor, a cylinder having an inlet port and an outlet port, a conduit entering said inlet port for supplying fluid under pressure, a ported control sleeve reciprocatable in said cylinder, said sleeve being formed with an external longitudinally extending groove which is positioned to register with said inlet port in all positions of reciprocation of said sleeve, said sleeve also being formed with at least one external longitudinally extending groove which is positioned on the side of said sleeve opposite from said first mentioned groove, and said sleeve also being formed with an internal circumferential groove which communicates with said external longitudinal grooves whereby the hydraulic pressure from fluid in said first mentioned groove acting inwardly against said sleeve are neutralized by pressures from fluid in the groove on the opposite side of the sleeve.

15. In a servomotor having a reciprocatable piston rod and a reciprocatable control valve rod, a main driven shaft, said shaft having a tubular end portion and having a torsion rod portion concentric with said tubular portion, a piston rod lever fixed to said tubular end portion of the main driven shaft and connected to said piston rod, a control valve lever fixed to an end portion of said torsion rod and connected at one end to said control valve rod, and manually operated means for moving said control valve lever to cause simultaneous axial twisting of said torsion rod and reciprocating movement of said control sleeve.

16. A servomotor, comprising a ported cylinder, a ported control sleeve reciprocatable in said cylinder, a piston reciprocatable within said control sleeve, a piston rod projecting exteriorly of said cylinder, a control sleeve rod also projecting exteriorly of said cylinder, a main driven shaft, said shaft having a tubular end portion and having a torsion rod portion concentric with said tubular portion, a piston rod lever fixed to said tubular end portion of the main driven shaft and connected to said piston rod, a control sleeve lever fixed to an end portion of said torsion rod and connected at one end to said control sleeve rod, and manually operated means for moving said control sleeve lever to cause simultaneous axial twisting of said torsion rod and reciprocating movement of said control sleeve.

17. A servomotor, comprising a ported cylinder, a ported control sleeve reciprocatable in said cylinder, a piston reciprocatable within said control sleeve, a piston rod projecting exteriorly of said cylinder, a control sleeve rod also projecting exteriorly of said cylinder, a main driven shaft, said shaft having a tubular end portion and having a torsion rod portion concentric with said tubular portion, a piston rod lever fixed to said tubular end portion of the main driven shaft and connected to said piston rod, a control sleeve lever fixed intermediate its length to an end portion of said torsion rod and connected at one end to said control sleeve rod, manually operated means for moving said control sleeve lever to cause simultaneous axial twisting of said torsion rod and reciprocating movement of said control sleeve, and means for limiting the movement of said control sleeve lever relative to the piston rod lever.

18. A servomotor, comprising a ported cylinder, a ported control sleeve reciprocatable in said cylinder, a piston reciprocatable within said control sleeve, a piston rod projecting exteriorly of said cylinder, a control sleeve rod also projecting exteriorly of said cylinder, a main driven shaft, said shaft having a tubular end portion and having a torsion rod portion concentric with said tubular portion, a piston rod lever fixed to said tubular end portion of the main driven shaft and connected to said piston rod, a control sleeve lever fixed intermediate its length to an end portion of said torsion rod and connected at one end to said control sleeve rod, manually operated means for moving said control sleeve lever to cause simultaneous axial twisting of said torsion rod and reciprocating movement of said control sleeve, and a pair of lugs projecting from said piston rod lever on opposite sides of the control sleeve lever and normally equally spaced therefrom for limiting the movement of said control sleeve lever relative to the piston rod lever.

19. In a servomotor having a reciprocatable piston rod and a reciprocatable control valve rod: a driven shaft having a main portion and a deformable torsion rod portion; a piston rod lever fixed to the main portion of said driven shaft and connected to said piston rod; a control valve lever fixed to the torsion rod portion of said driven shaft and connected to said control valve rod; and manually operated means for moving said control valve lever to cause simultaneous deformation of said torsion rod portion and reciprocating movement of said control valve.

20. In a servomotor: a ported cylinder; a ported control sleeve reciprocatable in said cylinder; a piston reciprocatable within said control sleeve; a reciprocatable piston rod projecting exteriorly of said cylinder; a reciprocatable control sleeve rod also projecting exteriorly of said cylinder; a driven shaft having a main portion and a deformable torsion rod portion; a piston rod lever fixed to the main portion of said driven shaft and connected to said piston rod; a control valve lever fixed to the torsion rod portion of said driven shaft and connected to said control valve rod; and manually operated means for moving said control valve lever to cause simultaneous deformation of said torsion rod portion and reciprocating movement of said control sleeve.

21. In a servomotor: a ported cylinder; a ported control sleeve reciprocatable in said cylinder; a piston reciprocatable within said control sleeve; a reciprocatable piston rod projecting exteriorly of said cylinder; a reciprocatable control sleeve rod also projecting exteriorly of said cylinder; a main driven shaft; a piston rod lever fixed to said main driven shaft and connected to said piston rod; a control valve lever pivotally connected to said main driven shaft adjacent the piston rod lever and connected to said control valve rod; manually operated means for pivoting said control valve lever to cause reciprocating movement of said control sleeve; and a pair of lugs projecting from said piston rod lever on opposite sides of the control sleeve lever and normally equally spaced therefrom for limiting the movement of said control sleeve lever relative to the piston rod lever.

22. In a servomotor: a driven shaft; an hydraulic ram drivingly connected to said driven shaft; a valve for controlling the operation of said ram; an operating shaft connected to said valve; a lost motion connection between said driven shaft and said operating shaft, said connection including a torsion rod connected to both of said shafts; and manually operating means for moving said operating shaft to cause deformation of said torsion rod and simultaneous operation of said valve.

ERVING A. PUERNER.

References Cited in the file of this patent

UNITED STATES PATENTS

| Number | Name | Date |
|---|---|---|
| 1,642,193 | Banning, Jr. | Sept. 13, 1927 |
| 1,954,379 | Eller | Apr. 10, 1934 |
| 2,244,296 | Heinrich et al. | June 3, 1941 |
| 2,408,770 | Frische | Oct. 8, 1946 |
| 2,451,263 | Webb | Oct. 12, 1948 |
| 2,462,994 | Price | Mar. 1, 1949 |

FOREIGN PATENTS

| Number | Country | Date |
|---|---|---|
| 4,186 | Great Britain | Oct. 19, 1878 |